Jan. 31, 1961  G. W. LIPSCOMB  2,970,265
ELECTRICAL MEASURING INSTRUMENTS
Filed Sept. 5, 1957  4 Sheets-Sheet 1

WITNESSES

INVENTOR
George W. Lipscomb
BY
ATTORNEY

Jan. 31, 1961         G. W. LIPSCOMB         2,970,265
ELECTRICAL MEASURING INSTRUMENTS
Filed Sept. 5, 1957                          4 Sheets-Sheet 2

Jan. 31, 1961   G. W. LIPSCOMB   2,970,265
ELECTRICAL MEASURING INSTRUMENTS
Filed Sept. 5, 1957   4 Sheets-Sheet 3
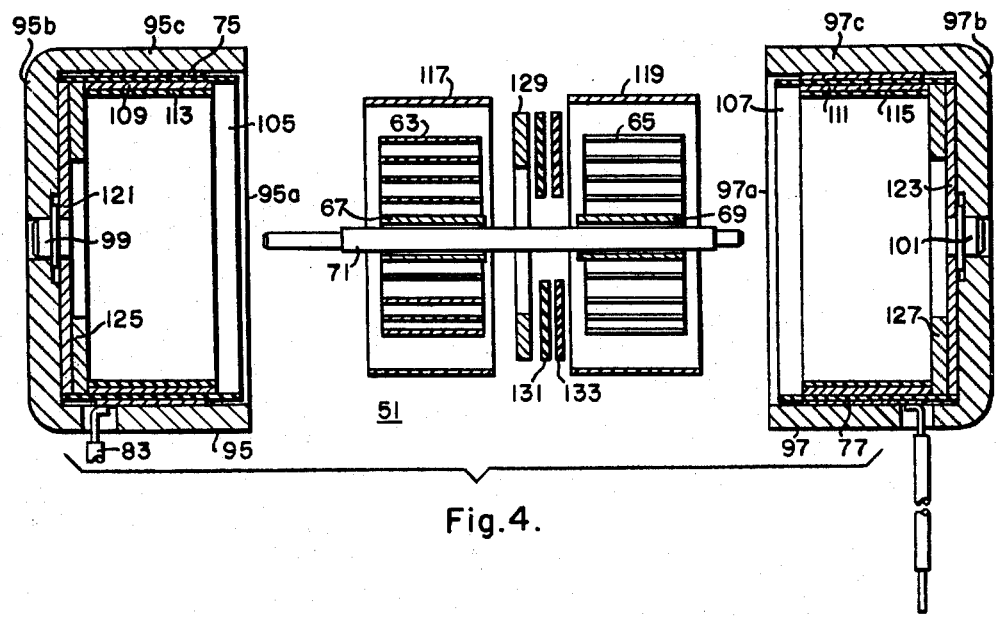
Fig.4.
Fig.5.
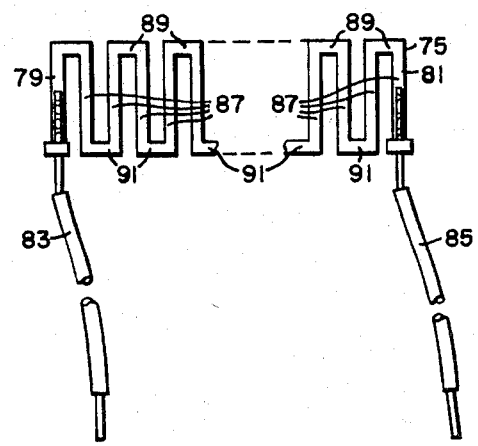

Jan. 31, 1961 G. W. LIPSCOMB 2,970,265
ELECTRICAL MEASURING INSTRUMENTS
Filed Sept. 5, 1957 4 Sheets-Sheet 4

United States Patent Office 2,970,265
Patented Jan. 31, 1961

2,970,265

ELECTRICAL MEASURING INSTRUMENTS

George W. Lipscomb, Raleigh, N.C., assignor to Westinghouse Electric Corporation, East Pittsburgh, Pa., a corporation of Pennsylvania Filed Sept. 5, 1957, Ser. No. 682,146

14 Claims. (Cl. 324—106)

This invention relates to electrical measuring instruments and has particular relation to electrical instruments of the thermal type which are responsive to alternating quantities.

In the past, thermal instruments have been constructed in a variety of forms for measuring different electrical quantities. As an example, in one known construction, a pair of thermoresponsive bimetallic spiral springs are wound in opposite directions about a common shaft to effect rotation of the shaft in opposite directions when heated. This arrangement provides compensation against changes in ambient temperature. Suitable heating means are generally associated with the springs to effect heating of the springs when alternating quantities are passed through heating means.

Such instruments have previously been employed to measure single electrical quantities such as voltage or current. This may be done by providing a single heater for one of the springs which is energized in accordance with the measured quantity. If the energizing quantity is a current quantity, this arrangement will provide an indication of the current demand on an associated circuit.

It has further been shown that if one of the heaters is energized in accordance with the sum of a voltage and current of an alternating current circuit and the other heater is energized in accordance with the difference of such voltage and current, then the shaft will rotate in accordance with the power of the circuit to provide an indication of the power demand.

In the present invention, a thermal instrument is provided having an improved arrangement of the instrument parts providing a very compact and efficient instrument. In a preferred embodiment of the invention, a thermal instrument is provided which includes a housing of two-part construction wherein the parts are separable in a direction which is parallel to the axis of a shaft supported by the housing. Each of the housing parts encloses a separate bimetallic spiral spring surrounding the shaft and a separate heating element for the spring. The shaft is supported by spaced bearings each carried by a separate one of the housing parts.

In order to effect heating of the springs, the invention provides one or more heating elements disposed in the form of loops which surround the associated springs to provide a concentric arrangement. Various spacers and insulators are provided in the housing parts to give desired performance characteristics. Each of these spacers and insulators surrounds the shaft with certain of them arranged concentrically with the heating elements and springs.

The invention further provides a thermal instrument as above described which is associated with an energy measuring device such as a watthour meter in a common casing. Preferably, the thermal instrument is energized in part from the watthour meter. To this end one or more current transformers are associated with the current windings of the watthour meter for energization in accordance with current transversing such windings. According to the invention, the current transformers are conveniently supported by the watthour meter such that portions of the current windings extend through openings of magnetic cores of the transformer.

It is therefore an object of the invention to provide a thermal instrument of improved construction responsive to electrical quantities.

It is another object of the invention to provide a thermal instrument including thermoresponsive bimetallic means with heating means for the bimetallic means of improved construction and arrangement.

It is a further object of the invention to provide a thermal instrument including a rotatable shaft driven by thermoresponsive means surrounding the shaft and heating means arranged in spaced surrounding concentric relation with respect to the thermoresponsive means.

It is another object of the invention to provide an instrument as defined in the preceding paragraph including a plurality of insulators and spacers each surrounding the shaft to provide desired performance characteristics of the instrument.

It is still another object of the invention to provide a combination energy and demand measuring instrument of improved construction.

It is a still further object of the invention to provide a combination energy and demand measuring instrument with improved means permitting energization of the demand device from the energy measuring device.

Other objects of the invention will become apparent from the following description taken in conjunction with the accompanying drawings in which:

Fig. 4 is an exploded view showing parts of the device of Fig. 3;

Fig. 5 is a view showing a development with parts broken away of a heater for the device of Figs. 3 and 4;

Figure 1:
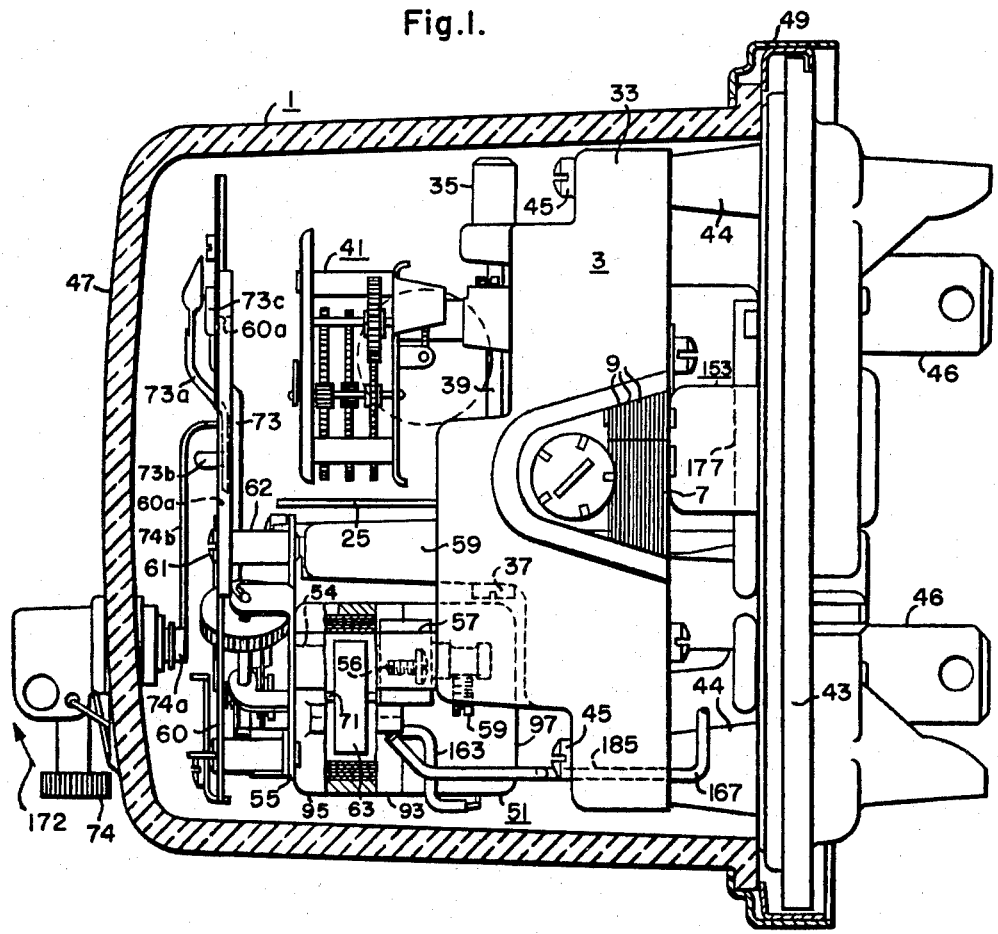
Figure 1 is a view in side elevation with parts shown in section of a combination energy and demand measuring instrument.

Referring to the drawings, there is illustrated in Fig. 1 a combination energy and demand measuring instrument represented generally by the numeral 1. The instrument 1 includes an energy measuring device such as a watthour meter 3 having an electromagnetic structure 5 (Fig. 2) which includes a magnetic structure 7 having the configuration illustrated in Figs. 1 and 2.

The structure 7 may be formed in any suitable manner. Preferably the structure 7 is composed of a plurality of laminations 9 of a suitable material such as silicon steel. The structure 7 includes a voltage pole 11 (Figs. 2 and 6) and a pair of spaced parallel current poles 13 and 15. The voltage pole 11 includes a pole face 17 which is spaced from the faces 19 and 21 of the current poles to define an air gap 23 through which an electro-conductive disc 25 (Figs. 1 and 2) rotates.

In order to effect energization of the structure 7, the pole 11 is provided with a voltage winding 27, whereas the poles 13 and 15 are provided with current windings 29 and 31.

A suitable frame 33 is provided with supports both the structure 7 and a pair of spaced bearings 35 and 37 to mount a shaft 39 to which the disc 25 is secured for rotation. The frame 33 also supports a suitable register assembly 41.

Figure 2:
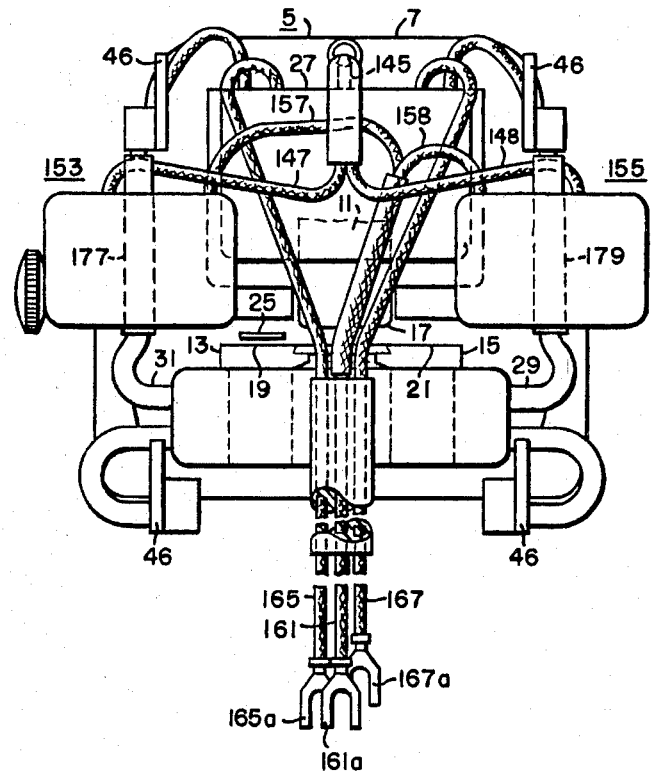
Fig. 2 is a view in rear elevation of the electromagnet of the energy measuring device of Fig. 1.

A suitable base plate 43 preferably formed of insulating material is provided to support the electro-magnet 5. To this end, the base plate includes projections 44 to which the frame member 33 is attached by suitable screws 45. The base plate includes further a plurality of openings (not shown) through which extend electroconductive contact blades 46 which are attached to terminals of the current windings in any suitable manner such as by welding as shown in Fig. 2. These contact blades are arranged to engage suitable contact jaws of a socket receptacle (not shown).

The instrument is inclosed by a suitable cover 47 preferably formed of a transparent material such as glass. The cover is secured to the base plate 43 by a suitable rim structure 49. A suitable construction for the casing and the socket of a detachable watthour meter is shown in the Bradshaw et al. Patent 1,969,499 which is assigned to the Westinghouse Electric and Manufacturing Company.

Figure 6:
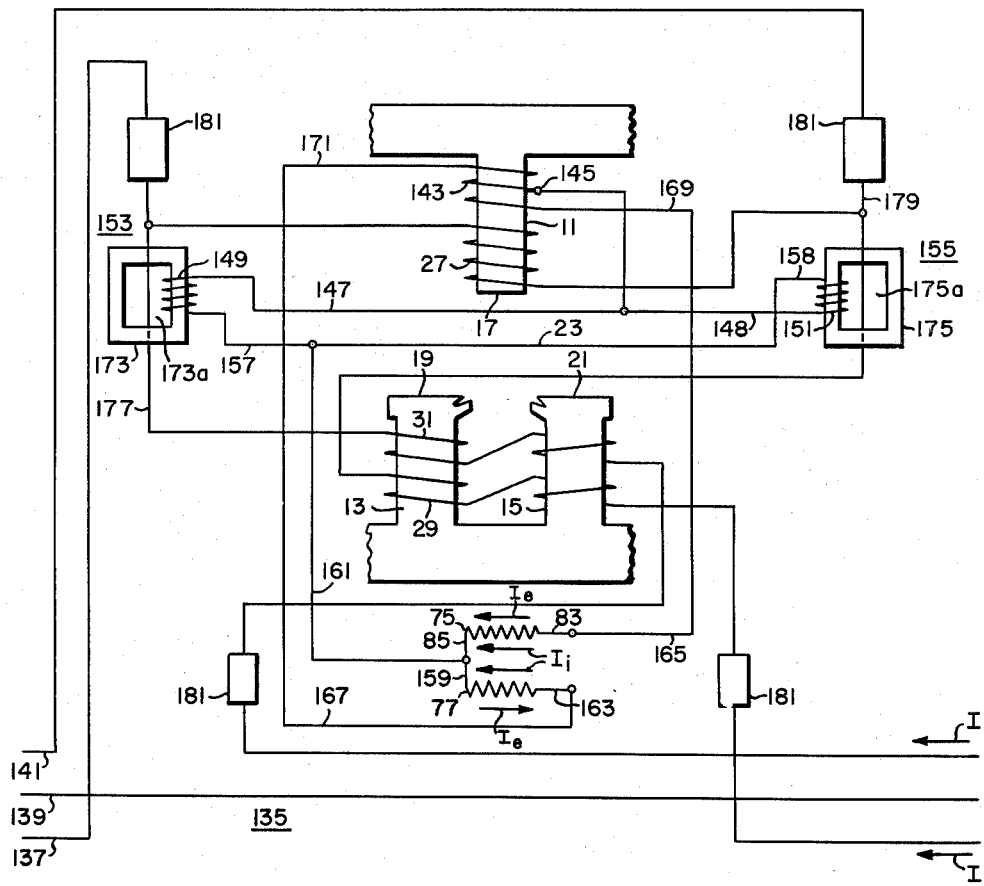
Fig. 6 is a schematic representation showing circuit connections for the instrument of Fig. 1.

In order to measure the maximum demand of an electrical quantity supplied to the watthour meter 3, the invention provides a demand measuring device 51 which is associated with the meter 3 within the same cover 47. Although the device 51 may be responsive either to current or energy of a circuit with which the meter 3 is associated, the device 51 will be described as an energy demand measuring device which is responsive to the energy of a three-wire single phase circuit 53 to which the meter 3 is connected as shown in Fig. 6.

Figure 3:
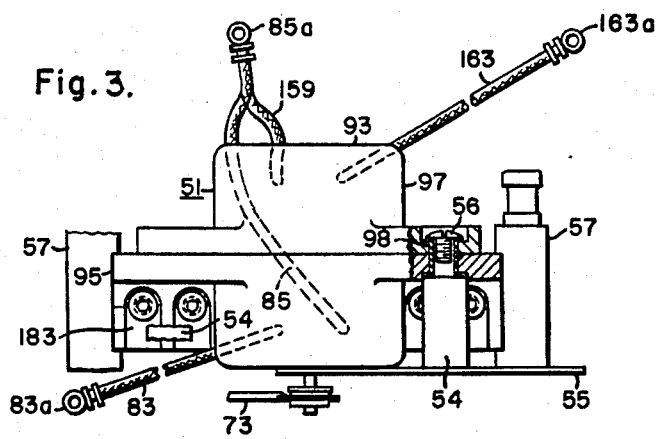
Fig. 3 is a view in top plan with parts shown in section and with parts broken away of the instrument of Fig. 1.

As illustrated in Figs. 1 and 3 the device 51 is mounted to a pair of spaced projections 54 of a support plate 55. Only one of these projections include threaded openings for receiving screws 56 which are supported by a riveted eyelet of the device 51 as will appear hereinafter. Additional spaced projections 57 of the plate 55 extend through openings (not shown) of the frame 33 and are secured thereto by screws 59. A face plate 60 is secured to the plate 55 as by screws 61 which are threadably received in threaded openings of extensions 62 of the plate 55. The plate 60 is provided with an opening 60a through which the register 41 is exposed for viewing.

As illustrated in Figs. 1, 3 and 4 the device 51 includes two bimetallic spiral springs 63 and 65 having their inner ends attached respectively to hubs 67 and 69. These hubs are attached to a common shaft 71 which carries a pusher arm 73 for rotation therewith. It will be understood that a bimetallic spring is formed of two dissimilar metals or alloys having different coefficients of thermal expansion. Consequently, when the bimetallic springs are heated, their inner ends tend to rotate relative to the outer ends which are fixed in permanent positions by means which will be described hereinafter.

For controlling the temperature of the springs 63 and 65, two identical heaters 75 and 77 are associated therewith. Each of the springs is heated by a separate one of the heaters. If a measurement of the current demand is desired, then only a single heater is required in association with one of the springs.

The springs 63 and 65 are so mounted that when heated, they tend to urge the shaft 71 in opposite directions of rotation. Consequently, variations in temperature which affect both springs equally have no appreciable effect on the rotation of the shaft 71 and the pusher arm 73 associated with the shaft. This means that ambient temperature variations have little effect on the accuracy of the device 51.

In accordance with the present invention, the heaters 75 and 77 are disposed in the form of loops which surround the springs in concentric relation therewith. Inasmuch as the two heaters are of identical construction, only one of the heaters will be described. Fig. 5 illustrates a development of the heater 75. As thereshown, the heater 75 is composed of a strip of suitable resistance material having terminals 79 and 81 to which are secured conductors 83 and 85 in any suitable manner, such as by welding.

Figure 7:
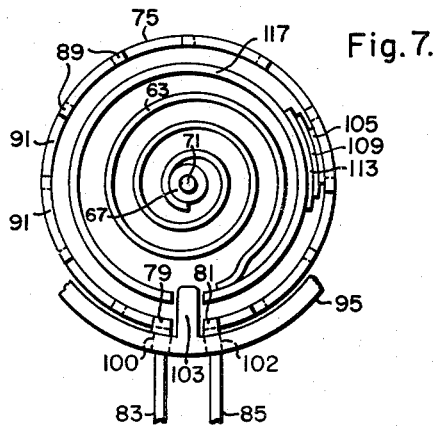
Fig. 7 is a view in front elevation of the device of Fig. 3 with parts removed and with parts broken away.

In Fig. 5 the heater 75 is shown as having a plurality of spaced parallel strip portions 87 intermediate the terminals 79 and 81. Separate pairs of the portions 87 have corresponding first ends which are connected by connecting portions 89 with the remaining ends of these separate pairs connected to corresponding ends of the adjacent portions 87 by connecting portions 91. As shown in Fig. 7, when the heater 75 is in an operative position, the portions 87 are spaced radially of the shaft 71 substantially equal distances from the shaft to extend along lines parallel to the axis of the shaft. This arrangement provides effective and uniform heating of the springs 63 and 65.

The operating parts of the device 51 are enclosed in a suitable housing 93 which is of two-part construction including housing parts 95 and 97 each formed of a suitable heat insulating material. The housing parts are of substantially identical construction each being of cup-shaped configuration with open ends 95a and 97a and closed ends 95b and 97b. These ends are connected by annular side walls 95c and 97c. The housing parts are mounted in engagement with their open ends adjacent each other such that the housing parts are separable in a direction which is parallel to the axis of the shaft 71 as shown in Fig. 4. The parts 95 and 97 may be secured together in any suitable manner such as by riveting with an eyelet 98 as shown in Fig. 3. Each of the housing parts provides an enclosure for housing a separate spring and heater assembly. It is further noted that suitable bearings 99 and 101 are positioned in openings of the closed ends of the housing parts to mount the shaft 71 for rotation.

It will be recalled that the device 51 is mounted to projections 54 of the plate 55 by screws 56. These screws 56 conveniently extend through openings of the eyelets 98 into threaded openings of the projections 54.

Referring to Figs. 4 and 7, the heaters 75 and 77 are mounted respectively in the housing parts 95 and 97 adjacent the inner surfaces of the side walls of the housing parts with the terminal conductors of the heaters extending through suitable openings 100 and 102 in the side walls of the housing parts. With reference to Fig. 7, it is noted that the terminals 79 and 81 of the heater 75 are spaced to provide a passage through which a rib 103 of the housing part 95 extends. A similar construction is provided in the housing part 97. The purpose of the rib 103 will be set forth hereinafter.

In order to obtain desired operating characteristics the device 51 includes a number of spacers and insulators for controlling the transmission of heat between the springs and heaters. In the present invention these spacers and insulators surround the shaft to facilitate assembly thereof. Refering to Fig. 4, there are shown electrical insulators 105 and 107 of tubular configuration positioned in engagement with the heaters 75 and 77 concentrically therewith. The insulators 105 and 107 serve to insulate the heaters 75 and 77 from tubular metallic members 109 and 111 which are located concentrically with respect to the heaters in engagement with the insulators 105 and 107. These members 109 and 111 assist in obtaining the proper time interval curve for the device 51. Additional insulators 113 and 115 of tubular configuration are positioned in engagement with the metallic members concentrically therewith to further assist in securing the proper time interval curve. The items 105, 107, 113 and 115 may be formed of any suitable insulating material.

As shown in Figs. 4 and 7, a pair of metallic rings 117 and 119 are positioned to surround respectively the springs 63 and 65 to engage the insulators 113 and 115. The outer ends of the bimetallic springs are attached to the rings 117 and 119, as shown in Fig. 7, in any suitable manner. Each of the tubular spacers, insulators and metallic members 105, 107, 109, 111, 113, 115, 117 and 119 are of split construction to receive the ribs 103 of the housing parts which serve to prevent rotation of these items.

Suitable circular discs 121 and 123 are provided to maintain the bearings 99 and 101 in their proper positions. The discs 121 and 123 may be formed of any suitable insulating material, such as a phenolic resin, and have openings for receiving the shaft 71 which extends through openings of the bearings. Suitable circular insulating spacers 125 and 127 preferably formed of cork engage the discs 121 and 123. The spacers 125 and 127 assist the items 109, 111, 113 and 115 in obtaining the proper time interval curve. Intermediate the springs 63 and 65 are located a circular insulating spacer 129 and circular insulating members 131 and 133 as viewed in Fig. 4. The spacer 129 may be formed of cork and the members 131 and 133 constructed of a phenolic resin. The items 121, 123, 125, 127, 129, 131 and 133 are split construction to receive the ribs 103 to prevent rotation of these items. It is noted with reference to Fig. 4 that the housing parts contain identical numbers and types of spacers, insulators and metallic members.

Rotation of the shaft 71 and of the pusher arm 73 is determined by the difference in temperatures of the springs 63 and 65. By proper energization of the heaters the rotation of the shaft and the pusher arm may be made dependent on energy flowing through the meter 3. Circuit connections suitable for this purpose are illustrated in Fig. 6.

Referring to Fig. 6, there is illustrated a three-wire single phase alternating current circuit represented generally by the numeral 135. This circuit includes three conductors 137, 139 and 141. The voltage winding 27 and the current windings 29 and 31 are shown associated with this circuit for the purpose of measuring energy flowing therethrough. For this purpose the winding 27 is connected across the conductors 137 and 141, whereas the windings 29 and 31 are connected respectively in series with the conductors 137 and 141.

The heaters 75 and 77 are connected for energization by a curent $I_e$ which varies in accordance with voltage across the conductors 137 and 141 of the circuit 135. Although the heaters could be connected to the circuit directly or through a separate transformer, an appreciable saving in space and cost may be realized by energizing the heaters from the voltage winding 27 of the meter 3. For this purpose, the voltage pole 11 is provided with an auxiliary secondary winding 143. The winding 143 constitutes the secondary winding of a transformer in which the winding 27 is the primary winding. Consequently, the output of the winding 143 may be represented by the current $I_e$ which varies in accordance with voltage of the circuit 135.

Each of the heaters is also heated by a current $I_i$ which varies in accordance with currents transversing the conductors 137 and 141 of the circuit 135. This current may be obtained by connecting a center tap 145 of the winding 143 to terminals 147 and 148 of secondary windings 149 and 151 of a pair of current transformers 153 and 155 associated respectively with the current windings 31 and 29. The remaining terminals 157 and 158 of the secondary windings are connected to terminals 85 and 159 of the heaters by a conductor 161. The other terminals 83 and 163 of the heaters are connected respectively to conductors 165 and 167 which are connected to the outer terminals 169 and 171 of the winding 143. With this arangement, the curent $I_i$ in each heater is equal to approximately one-half of the sum of the currents flowing in the conductors 137 and 141 of the circuit.

Instantaneous directions of flow for the currents $I_e$ and $I_i$ are indicated by arrows in Fig. 6. It is observed that the directions of flow are such that the currents $I_e$ and $I_i$ add vectorially in the heater 75, and subtract vectorially in the heater 77. Consequently, when current flows in the circuit 135, a larger resultant current flows in the heater 75 than in the heater 77. With a circuit as illustrated in Fig. 6, rotation of the shaft 71 and the pusher arm 73 of the device 51 is dependent upon energy flowing in the circuit 135.

Rotation of the shaft 71 may be shown in any desired manner. For example, a maximum demand pointer 73a may be mounted for rotation over the face plate 60. In the embodiment illustrated in Fig. 1, the pointer 73a may be frictionally mounted in the path of a portion of the arm 73 to be actuated thereby. It is noted that a portion 73b of the arm 73 extends through the opening 60a of the plate 60 to engage the pointer 73a when the arm 73 is rotated. Consequently, the pointer 73a takes a position which corresponds to the maximum rotation of the arm 73 during any desired period. The arm 73 also includes a part 73c which extends through the opening 60 to provide an indication of the demand at any given time.

At the end of this period, the pointer 73a may be reset by means of a resetting knob 74 which cooperates with a shaft 74a projecting through the cover 47. This shaft carries a spring arm 74b which is located in the path of the pointer 73a. When the knob 74 is pivoted through 90° in the direction of the arrow 172, rotation of the knob about a horizontal axis effects rotation of the shaft 74a which carries the spring arm 74b into engagement with the pointer 73a for returning the pointer into engagement with a zero stop (not shown). At this point the arm 74b slips over the pointer 73a to leave the pointer free for further actuation by the arm 73.

In accordance with the present invention, the current transformers 153 and 155 are supported by the meter 3 in association with the current windings 29 and 31. In the preferred embodiment illustrated in Figs. 1, 2 and 6, the transformers include magnetic cores 173 and 175 of toroidal configuration providing openings 173a and 175a through which terminal portions 177 and 179 of the current windings extend. The cores and secondary windings of the current transformers may be enclosed in insulating casings formed of any suitable insulating material. As best shown in Fig. 1, the current transformer assemblies are secured to the magnetic structure 7 at the rear of the structure in any suitable manner to receive the terminal portions 177 and 179 which extend parallel to the current poles 13 and 15 as schematically shown in Fig. 6.

In Fig. 6, blocks 181 are illustrated which represent the connection established by attachment of the contact blades 45 to the contact jaws of a socket receptacle (not shown). In order to permit the establishment of the connections required to energize the device 51, a suitable terminal block 183 is shown in Fig. 3 as constituting an integral part of the housing part 95 of the device 51. The several conductors 83, 85 and 15a together, 161, 163, 165 and 167, are provided respectively with electroconductive terminal parts 83a, 85a, 161a, 163a, 165a and 167a to facilitate securement of these conductors to the terminal block 183. For this purpose the terminal block is provided with a plurality of threaded openings for receiving suitable threaded screws for securing the conductors to the block. It is noted in Fig. 1 that the frame 33 includes an opening 185 through which conductors 161, 165 and 167 extend to the terminal block 183. The terminal parts 161a, 165a and 167a are of the open end type permitting ready detachment of the conductors 161, 165 and 167 from the terminal block to allow removal of the device 51 from an operative position.

As illustrated in Fig. 3, the several conductors associated with the windings 27 and 143 and with the current transformers are located at the rear of the structure 7 to provide a very compact and neat appearing arrangement.

Although the invention has been described with reference to certain specific embodiments thereof, numerous

I claim as my invention:

1. In a terminal device responsive to a variable electrical quantity, a shaft mounted for rotation about an axis, a thermoresponsive bimetallic spiral spring wound about said shaft effective when heated to rotate said shaft, and a heating element effective when energized for heating said spring, said heating element having a pair of spaced terminals to be energized in accordance with said electrical quantity, said heating element comprising a strip of resistance material having a plurality of strip portions intermediate said terminals spaced about said axis, said strip being disposed to surround said shaft and said spring with said strip portions spaced radially substantially equal distances from said axis to extend parallel to said axis.

2. In a thermal device responsive to a variable electrical quantity, a shaft mounted for rotation about an axis, a thermoresponsive bimetallic spiral spring wound about said shaft effective when heated to rotate said shaft, a heating element effective when energized for heating said spring, said heating element having a pair of spaced terminals to be energized in accordance with said electrical quantity, said heating element being disposed in the form of a loop to surround said shaft and said spring concentrically with said spring, said heating element being configured to direct energizing current along a path having a plurality of spaced path portions spaced radially of said axis and spaced from said spring, said path portions extending parallel to said axis, and a plurality of insulating members and metallic members each of tubular configuration positioned in the space between said path portions and said spring to surround said shaft and said spring in concentric relation with said spring for controlling the transmission of heat between said heating element and said spring.

3. In a thermal device responsive to a variable electrical quantity, a housing formed of insulating material, a shaft mounted by said housing for rotation about an axis, a pair of thermoresponsive bimetallic spiral springs wound about said shaft spaced axially along said shaft, said springs being effective when heated to rotate said shaft in opposing directions, said housing comprising a pair of separable cup-shaped sections each having a chamber constructed of only a single, solid insulating wall and accommodating a separate one of said springs, said sections having their open ends substantially abutting and being separable in a direction parallel to said axis to expose the springs, and heating means including a heating element having a pair of spaced terminals to be energized in accordance with said electrical quantity, said heating element being disposed in the form of a loop positioned in one of said chambers to surround said shaft and one of said springs in spaced concentric relation with said spring.

4. In a thermal device, a housing formed of insulating material, a shaft mounted by said housing for rotation about an axis, a pair of thermoresponsive bimetallic spiral springs wound about said shaft spaced axially along said shaft, said springs being effective when heated to rotate said shaft in opposing directions, said housing comprising a pair of separable cup-shaped sections each having a chamber constructed of only a single, solid insulating wall and accommodating a separate one of said springs, said sections having their open ends substantially abutting and being separable in a direction parallel to said axis to expose said springs, heating means including a pair of heating elements each having a pair of spaced terminals, each of said heating elements being disposed in the form of a loop positioned in a separate one of said chambers to surround said shaft and the associated spring in spaced concentric relation with the associated spring, a separate plurality of first insulating members and metallic members each of tubular configuration positioned in each of said chambers in the space between the associated spring and heating element to surround said shaft and the associated spring, and a plurality of second insulating members surrounding said shaft in the space between said springs, said insulating members and metallic members controlling the transmission of heat between said heating elements and said springs.

5. In a thermal device, a housing formed of insulating material comprising a pair of separable cup-shaped sections each having spaced open and closed ends connected by only one solid annular side wall to define a chamber, said sections being positioned with their open ends substantially in engagement with said chambers communicating through said open ends, each of said closed ends having an opening extending therethrough, a separate bearing member positioned in each of said openings, a shaft mounted by said bearing members for rotation about an axis extending parallel to said side walls, heating means including a heating element having a pair of spaced terminals, said heating element being disposed in the form of a loop positioned in one of said chambers in engagement with said side wall to surround said shaft, a pair of thermoresponsive bimetallic spiral springs wound about said shaft each within a separate one of said chambers, said heating element surrounding the associated spring in spaced concentric relation therewith, said springs being effective when heated to rotate said shaft in opposing directions, the side wall of said one of said chambers having a pair of spaced apertures extending therethrough, and a pair of terminals conductors each secured to a separate one of said terminals, each terminal conductor extending through a separate one of said apertures externally of said one chamber.

6. In a thermal device, a housing formed of insulating material comprising a pair of separable cup-shaped sections each having spaced open and closed ends connected by only one solid annular side wall to define a chamber, said sections being positioned with their open ends substantially in engagement with said chambers communicating through said open ends, each of said closed ends having an opening extending therethrough, a separate bearing member positioned in each of said openings, a shaft mounted by said bearing members for rotation about an axis extending parallel to said side walls, heating means including a heating element having a pair of spaced terminals, said heating element being disposed in the form of a loop positioned in one of said chambers in engagement with said side wall to surround said shaft, a pair of thermoresponsive bimetallic spiral springs wound about said shaft each within a separate one of said chambers, said heating element surrounding the associated spring in spaced concentric relation therewith, said springs being effective when heated to rotate said shaft in opposing directions, the side wall of said one of said chambers having a pair of spaced apertures extending therethrough, a pair of terminal conductors each secured to a separate one of said terminals, each terminal conductor extending through a separate one of said apertures externally of said one chamber, and a terminal block integral with the section containing said heating element, said terminal block being arranged to permit the connection of said terminal conductors to heater element energizing conductors.

7. In a thermal device, a housing formed of insulating material comprising a pair of separable cup-shaped sections each having spaced open and closed ends connected by only one solid annular side wall to define a chamber, said sections being positioned with their open ends substantially in engagement with said chambers communicating through said open ends, each of said closed ends having an opening extending therethrough, a separate bearing member positioned in each of said openings, a shaft mounted by said bearing members for rotation about an axis extending parallel to said side walls, heating means including a heating element positioned in one of said chambers, and a pair of thermoresponsive bimetallic spiral springs wound about said shaft each within a separate one of said chambers, said heating element surrounding the shaft and the associated spring in spaced concentric relation with the spring, said springs being effective when heated to rotate said shaft in opposing directions.

8. In a measuring device, a watthour meter including a magnetic structure having parallel spaced current magnetic poles, current winding means for said current poles, said current winding means having a terminal portion extending parallel to said current poles; an electromagnetic assembly secured to said magnetic structure, said assembly including a magnetic core surrounding said terminal portion, said terminal portion constituting a single turn primary winding, and secondary winding means linking said magnetic core; and a thermal meter including thermoresponsive means, and heating means for heating said thermoresponsive means, said heating means including terminal means connected for energization from said secondary winding means.

9. In a measuring device, a watthour meter including a magnetic structure having a voltage magnetic pole and parallel spaced current magnetic poles, a voltage winding for said voltage pole for energization in accordance with voltage of a three-wire circuit, a pair of current windings for said current poles each for energization in accordance with a separate current of said circuit, said current windings having terminal portions spaced from the magnetic structure extending along spaced lines parallel to said current poles, an additional winding having a center terminal and a pair of end terminals surrounding said voltage pole in inductive relation to said voltage winding, a pair of current transformer assemblies secured to said magnetic structure in spaced relation, said assemblies including a pair of magnetic cores each surrounding a separate one of said terminal portions, and a secondary winding for the core having a pair of terminals, said secondary windings producing current outputs at said pairs of terminals proportional respectively to currents traversing said current windings, the terminals of one of said secondary windings being connected to the other of said secondary windings to provide a parallel circuit connection of the secondary windings, one pair of connected terminals of said secondary windings being connected to said center terminal, a thermal meter including thermoresponsive means, and heating means comprising a pair of resistance heaters for heating said thermoresponsive means, said heaters including respectively first terminals connected together and spaced second terminals, said connected first terminals being connected to the other pair of connected terminals of said secondary windings, each of said second terminals being connected to a separate one of the end terminals of said additional winding.

10. In a thermal device, a housing formed of insulating material, a shaft mounted by said housing for rotation about an axis, a thermoresponsive bimetallic spiral spring wound about said shaft, said spring being effective when heated to rotate said shaft, heating means including a heating element having a pair of spaced terminals, said heating element being disposed in the form of a loop positioned in said housing to surround the shaft and the spring in spaced concentric relation with the spring, a plurality of insulating members and metallic members each of tubular configuration positioned in said housing in the space between the spring and heating element to surround the spring in concentric relation therewith, each of said insulating members and metallic members being of split construction to provide a pair of spaced ends of each of the members, and an insulating rib member secured to said housing to extend radially of said shaft between the spaced ends of each of the insulating members, metallic members, and heating element.

11. In a measuring device, a watthour meter including a magnetic structure having parallel spaced current magnetic poles, current winding means for said current poles, said current winding means having a terminal portion extending parallel to said current poles; an electromagnetic assembly secured to said magnetic structure at one side of said magnetic structure, said assembly including a magnetic core surrounding said terminal portion, said terminal portion constituting a single turn primary winding, and secondary winding means linking said magnetic core; and a thermal meter positioned on the other side of said magnetic structure opposite to said one side, said thermal meter including thermoresponsive means, and heating means for heating said thermoresponsive means, said heating means including terminal means connected for energization from said secondary winding means.

12. In a thermal device, a first integral cup-shaped insulating housing member having only one solid annular wall, a second integral cup-shaped insulating housing member having only one solid annular wall, said members having a common axis and being secured to each other with their open ends adjacent each other, a first spiral temperature-responsive bimetallic element disposed substantially within the first cup-shaped housing member, said element being wound about the axis, a second spiral temperature-responsive bimetallic element disposed substantially within the second cup-shaped housing member, said last-named element being wound around said axis, means differentially responsive to the outputs of said elements, and heating means disposed in one of said members.

13. In a thermal device, a thermoresponsive element having a periphery arcuate about an axis, an electroresponsive heating unit for heating the element, said heating unit comprising a zig-zag electrical heater member substantially concentric with said element about said axis, said member comprising an elongated resistance member repeatedly crossing and recrossing a plane transverse to said axis in a zig-zag path which is arcuate about said axis, said path being radially spaced outwardly from the element at substantially all points.

14. In a measuring device, an induction watthour meter including a planar magnetic structure having voltage magnetic poles and a pair of spaced parallel current magnetic poles defining an airgap, first current winding means for said current magnetic poles, said first winding means having a terminal portion spaced from said magnetic poles to extend parallel to said poles, a voltage winding cooperating with the current windings when energized from an alternating source for establishing a shifting magnetic field in the airgap, an electroconductive armature having a portion mounted in the airgap and mounted for rotation relative to the magnetic structure by the magnetic field, a magnetic core secured to said magnetic structure surrounding said terminal portion, said terminal portion constituting a single turn primary winding, second winding means linking said magnetic core, and a thermoresponsive measuring device having heater connected for energization from said second winding means, an insulating base supporting said electromagnetic structure with the magnetic structure spaced from the base, said magnetic core being secured to said magnetic structure in the space between said magnetic structure and said base to surround said terminal portion.

References Cited in the file of this patent

UNITED STATES PATENTS

| Number | Name | Date |
|---|---|---|
| 2,081,044 | Runaldue | May 18, 1937 |
| 2,212,730 | Downing | Aug. 27, 1940 |
| 2,234,570 | Markley | Mar. 11, 1941 |
| 2,382,315 | Hiller | Aug. 14, 1945 |
| 2,385,044 | Vassar | Sept. 18, 1945 |
| 2,509,364 | Paine | May 30, 1950 |
| 2,521,869 | Petzinger | Sept. 12, 1950 |
| 2,656,512 | Lenehan | Oct. 20, 1953 |